Patented May 26, 1931

1,807,543

UNITED STATES PATENT OFFICE

JOHN D. MORGAN, OF MAPLEWOOD, NEW JERSEY, ASSIGNOR TO DOHERTY RESEARCH COMPANY, OF NEW YORK, N. Y., A CORPORATION OF DELAWARE

SILICATE REFRACTORY AND PROCESS OF FORMING SAME

No Drawing. Application filed June 21, 1926. Serial No. 117,609.

The present invention relates to refractories and more particularly to refractories having a silicate base.

It has been recognized that zircon (zirconium silicate) possesses very valuable refractory qualities. Very little practical application of zircon has been made, however, owing to difficulties in manufacturing satisfactory articles from aggregates of this material.

One of the objects of the present invention is to provide a simple and economical method of forming refractory articles from zircon particles and which shall have characteristics approaching those of the native massive zircon as to resistance to high temperature and resistance to heat flow.

Further objects and advantages of the present invention will be apparent to those skilled in the art from the following description:

A specific example of a satisfactory way of carrying out the process according to the present invention comprises the bonding of zircon (zorconium silicate) particles to form useful articles by heating in the presence of barium carbonate. Preferably, the barium carbonate is precipitated in contact with particles to be bonded. For instance, zircon particles of a fineness from 120—250 mesh may be treated with barium chlorid so that the surfaces of all the particles are well moistened or wetted by the chlorid solution. The wetted particles are then treated with a solution of soluble carbonate, preferably ammonium carbonate, thereby precipitating barium carbonate on the surfaces of the particles and forming at the same time ammonium chlorid (sal ammoniac). The carbonate thus precipitated on the refractory particles adheres to the particles so that the soluble ammonium chlorid formed at the same time may be washed out of the mixture, if so desired, without dislodging the carbonate from the zircon particles. The ammonium chlorid formed at the time the carbonate is precipitated may be washed out of the mixture before it is burned, but if it is not washed out it is readily volatilized and driven off by the heat, usually before the carbonate has been converted into oxid. Tests made on articles formed by the method according to the present invention in which the ammonium chlorid was not washed out before heating the formed articles do not show any material difference as compared with those in which the chlorid was washed out during the process of formation, except that the articles from which the chlorid was washed out prior to burning are slightly denser. In case sodium carbonate or the like is used as the precipitant, however, the sodium or other chloride formed should be washed out of the mixture completely before it is burned. Materials which would lower the melting point of the finished article may be present at the start of the firing of the mixture provided they are eliminated during the firing.

Preferably, the amount of barium carbonate precipitated on the zircon particles is between 1% and ½% of the zircon by weight when the barium is calculated as oxid. The mixture of barium carbonate and zircon with or without the ammonium chlorid is then formed into shapes as desired and burned to cause the zircon particles to become united and thus form refractory articles. The final temperature of the burning step just mentioned is preferably about 2800° F. The zircon carbonate mixture is brought up to a temperature of 2800° F. somewhat gradually and, as the temperature rises, the barium carbonate is broken down to form barium oxid with elimination of carbon dioxid.

The carbon dioxid given off from the barium carbonate during the burning step does not come off all at once but continues to be driven off after the bonding action has begun. The result is that the finished article has a large number of minute pores. However, these pores are so small that gas cannot be driven through the finished zircon article except under a relatively high pressure. This is a decided advantage in fire-brick. The porous refractory formed according to the present invention is, moreover, an exceedingly good heat insulator.

While barium carbonate is the preferred substance for use in making articles according to the present invention, calcium carbonate, and magnesium carbonate give almost as good results. Moreover, any carbonate capable of being precipitated in contact with the particles to be bonded may be used, but the better results are obtained when the carbonate used is one yielding a somewhat refractory oxid when decomposed. The alkali carbonates are unsuitable for use according to the present invention on account of their well-known fluxing effects, and they cannot be precipitated on account of their high solubility. Other substances tending to reduce the melting point of either the oxide or the aggregate should not be present during the latter part of the heating step. An example of a substance having a harmful effect on the finished article in reducing its softening and melting points is silica. This substance as is known, combines with lime at certain temperatures. The resulting calcium silicate melts much more readily than either zircon, barium oxide, calcium oxide or magnesium oxide.

While I have mentioned above that the preferred percentage of the metallic element, calculated as oxid, lies between 1% and ½%, the percentage of oxid based upon the weight of the finished article, however, may be as much as 1½% and may fall below ½% to 0.1%. It is not desirable to use more of the metallic elements, estimated as oxid, than 1½% based upon the weight of the finished article.

While zircon (zirconium silicate) is the preferred aggregate material for use in forming articles according to the present invention I do not limit myself to zircon, the present invention being useful with particles of any refractory silicate, and more especially native silicates. By the term "silicate", I mean to include any substance containing a metal in combination with silicon and oxygen.

While it is difficult to find a process for bonding zircon capable of giving satisfactory results in producing articles whose melting points are at all comparable to those of native zircon, any process yielding good results in bonding zircon may be expected to prove satisfactory for bonding other refractory substances and particularly native silicates.

In the preparation of the particles of the aggregate for forming the body of an article in accordance with the method of the present invention the particles may be carefully graded to produce a minimum of voids and thereby a dense article when such is desired. The grading of the aggregate particles as just mentioned also produces an increase of mechanical strength in the finished article. However, a ratio between ½ to 1 and 4 to 1 of 120 mesh and finer than 200 mesh zircon particles to zircon particles larger than 120 mesh has been found to give good results. The invention, it will be understood is not limited to any particular ratio of sizes of the aggregate particles.

Having thus described my invention, I claim:

1. The method of forming refractory articles comprising heating zircon particles in the presence of less than one and one half percent of insoluble carbonate material.

2. The method of forming refractory articles comprising heating particles of native refractory silicate in the presence of a small percentage of barium carbonate.

3. The method of forming refractory articles comprising heating zircon particles in the presence of a small percentage of barium carbonate and in the substantial absence of other non-volatile material.

4. The method of making refractory articles comprising precipitating on refractory particles a small percentage of carbonate material, forming the mixture of refractory particles and carbonate into a desired shape, and heating the articles so formed.

5. The method of making refractory articles comprising precipitating on zircon particles a small percentage of barium carbonate, forming the mixture of silicate and carbonate to a desired shape and heating the article so formed.

6. A refractory article comprising substantially only zircon and barium oxide.

7. A refractory article comprising substantially only a refractory material and between 1½% and $\frac{1}{10}$ of 1% of oxide of a metal formed from an insoluble carbonate.

8. An article as set forth in claim 7 and in which the material is zircon.

9. The method of making refractory articles comprising precipitating a small percentage of a carbonate upon the surfaces of particles of a refractory aggregate, forming the mixture into the desired shape, heating the articles so formed to convert the carbonate into an oxide and drive off carbon dioxide.

10. The method of making refractory articles comprising precipitating a small percentage of barium carbonate upon the surfaces of particles of a refractory aggregate, forming the mixture into the desired shape and heating the articles thereby converting the carbonate into barium oxide and driving off carbon dioxide to give the resulting bonded refractory a porous structure.

In testimony whereof I affix my signature.

JOHN D. MORGAN.